United States Patent

[11] 3,582,917

[72] Inventors Friedrich R. Hertrich; Sanford Platter, both of Boulder, Colo.
[21] Appl. No. 783,696
[22] Filed Dec. 13, 1968
[45] Patented June 1, 1971
[73] Assignee International Business Machines Corporation Armonk, N.Y.

[54] MAGNETIC HEAD HAVING A CONTINUOUSLY VARIABLE RADIUS OF CURVATURE
6 Claims, 8 Drawing Figs.

[52] U.S. Cl. ........ 340/174.1, 179/100.2
[51] Int. Cl. ........ G11b 5/60
[50] Field of Search ........ 340/174.1 E, 174.1 F; 179/100.2 P, 100.2 C

[56] References Cited
UNITED STATES PATENTS

| | | | |
|---|---|---|---|
| 3,398,870 | 8/1968 | Mullen et al. | 340/174.1 |
| 3,416,148 | 12/1968 | Berghaus et al. | 340/174.1 |
| 3,416,149 | 12/1968 | Stahler | 340/174.1 |
| 3,475,739 | 10/1969 | la Manna | 340/174.1 |

*Primary Examiner*—Terrell W. Fears
*Assistant Examiner*—Vincent P. Canney
*Attorney*—Sughrue, Rothwell, Mion, Zinn and Macpeak

ABSTRACT: A magnetic head employing a fluid bearing between the head operating surface and a tape moving thereover, with the head surface configuration characterized by a continuously varying radius of curvature.

INVENTORS
FRIEDRICH R. HERTRICH
SANDFORD PLATTER

BY Sughrue, Rothwell, Mion, Zinn & Macpeak
ATTORNEYS

INVENTORS.
FRIEDRICH R. HERTRICH
SANDFORD PLATTER

BY Sughrue, Rothwell, Mion, Zinn & Macpeak
ATTORNEYS.

MAGNETIC HEAD HAVING A CONTINUOUSLY VARIABLE RADIUS OF CURVATURE

BACKGROUND OF THE INVENTION

1. Field of the Invention

This invention relates to magnetic transducer apparatus and more particularly to flexible record media transducing head of a type employing a self-generated fluid bearing between the moving record media and the transducing operating head surface for supporting the record media spaced slightly from the transducing head.

2. Description of the Prior Art

When a flexible record media such as a magnetic tape is moved at some velocity over the operating surface of a tape read or write head, a hydrodynamic air film is formed between the tape and the head surface, which acts as a fluid lubricant. The gap existing between the moving tape and the head surface should, necessarily, be maintained as small as possible to ensure maximum transducing efficiency while at the same time sufficiently large to prevent wear on both the tape and its head surface. The hydrodynamic fluid film which is created due to relative velocity between the tape and the head, tends to maintain the tape out of contact with the head surface. The parameters involved in the maintenance of a controlled air film between the tape and head surfaces are: the shape of the head, the velocity of the tape, the tension acting on the tape, the angle at which the tape is wrapped about the head, and the viscosity of the fluid. The relationship between these parameters is set forth in U.S. Pat. No. 3,170,045 to Heard K. Baumeister et al. and assigned to the common assignee.

The magnetic head of that patent, in one form employs an operating surface having a constant radius of curvature with the tape partially wrapped thereabout under applied tension. The thickness or spacing of the fluid bearing is determined by the formula:

$$0.642=\frac{h^*}{R}\left(\frac{T}{6\mu V}\right)^{2/3}$$

where $h^*$ is the air film thickness, $T$ is the tape tension, $\mu$ is the viscosity of the fluid medium (normally air), $V$ is the tape velocity and $R$ is the radius of the curved working surface of the head.

Since the radius of curvature of a transducer head of this type is constant, the air bearing thickness is determined by a single radius value. This thickness is maintained constant only if the fluid bearing exists over an appreciable arc length along the operating surface of the head. If the arc length is too short, it is impossible to maintain a constant fluid bearing over the surface of the head structure. This affects the wear properties of the tape and the head operating surface, as well as the transcribing quality of the apparatus. Sufficient arc length may be achieved by employing large radii or by wrapping the tape at substantial wrap angles over small radii. This, however, is not a satisfactory solution in all cases since, problems exist where large radii are used, since the tape to head separation $h^*$ is directly proportional to radius as set forth in the above formula.

Attempts have been made to solve this problem by providing a transducer whose operating surface has curved portions including at least the entry and transducing portion having different radii of curvature. The radius of curvature of the entry portion is generally smaller than the portion of the structure containing the transducing gap itself. A structure of this type is set forth in copending patent application, Ser. No. 420,602, entitled "Compound Radius Transducer Head," filed Dec. 23, 1964, to Donald G. Berghaus et al. and assigned to the common assignee. This arrangement provides a small constant fluid bearing over the entire transducing portion of the head with reduced tape and operating surface and it is particularly useful in transducing systems where it is not possible to provide a large wrap angle for the flexible record media. However, the employment of compound surfaces of different radii causes the contour to go from one radius into another radius and back with an abrupt change causing a dynamic jerk due to the step change of curvature. Hence to produce "washboard" effect on the variations in the pressure and the air film which are abrupt resulting in tape flutter and which both affects recording performance, and wear to the tape and the head surface.

The same problem of step change in curvature occurs where a single radius of curvature is employed for the transducing portion of the operating surface with adjoining portions of the working surface are flat. Normal forces acting on the tape by the self induced or applied fluid film, do not exist in the flat section. As a result, very weak restoring forces exist to control the desired spacing prior to passing of the tape over the relatively short cylindrical portion carrying the transducer means. Air bubbles may form under dynamic conditions which upset the head to tape relationship at the transducer gap and also, damping of transverse oscillations (up and down) of the tape is insufficient which greatly affects recording and/or reading performance.

SUMMARY OF THE INVENTION

This invention is directed to the magnetic transducer head having a curved operating surface whose radius of curvature is continuously varying such that no step change in curvature occurs. The surface is continuous up to the second derivative and it has the desired radius of curvature in the gap region, the required entrance and exit angle and the required radius of curvature in the entrance, exit and central regions. The surfaces may be self-lubricating under hydrodynamic air lubrication principles or externally induced by the application of pressurized fluid. Further, vacuum pressure may be employed for reducing either the applied or self-induced air film in the vicinity of the transducer gap or gaps.

DESCRIPTION OF THE PREFERRED EMBODIMENT

Figure 1:
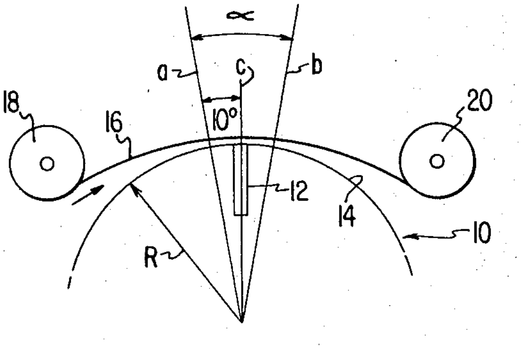
FIG. 1 PRIOR ART
FIG. 1 is a schematic representation of a prior art, single radius, curved magnetic transducer head employed with a hydrodynamically air lubricated magnetic tape.

Referring to the drawings, prior to discussing the structural aspects of the curved operating surface transducer head of the present invention, reference may be had to FIG. 1 which illustrates schematically a transducer head employing a single radius, curved operating surface over a moving magnetic tape overlying the same and supported by a self-induced or hydrodynamic air bearing. This type of head is shown in the aforementioned U.S. Pat. No. 3,170,045. The transducer head 10 is characterized by a radius R of constant value with the transducer gap 12 centrally located with respect to the entry and exit portions of the transducer head operating surface.

The magnetic tape 16 in moving, in the direction of the arrow, at high speed from the supply reel 18 to the takeup reel 20 results in a self-induced air film existing between operating surface 14 of the transducer head and the magnetic tape 16. Applied tension and the positioning of the reels 18 and 20, provide an angle of wrap which is shown as being equally divided on either side of the gap 12. The Figure shows a tape wrap of about 10° to each side of the gap.

Figure 2:
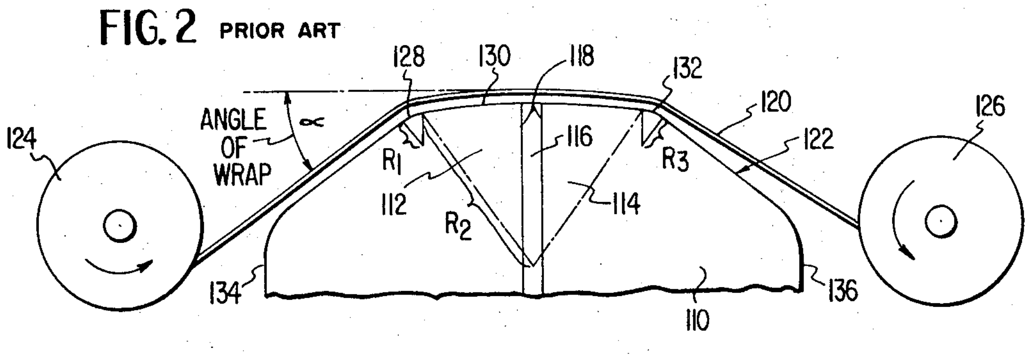
FIG. 2 PRIOR ART
FIG. 2 is a schematic representation of a prior art curved magnetic transducer head having curved compound surfaces with the magnetic tape supported by a hydrodynamic air bearing.

Turning next to FIG. 2, there is shown a prior art magnetic transcribing head design characterized by an operating surface composed of compound radii, of the type described in the pending application entitled "Compound Radius Transducer Head," previously referred to. In this case, the magnetic transducer at 110 comprises a read portion for instance 112 and a write portion 114 separated by a section 116 located centrally of the head. At the transducer gaps 118, the magnetic tape 120 is separated from the operating surface 122 of the transducer head by an air bearing film which exists between these elements. The spacing of the magnetic tape which moves, under tension in the direction of the arrow, from supply reel 124 to takeup reel 126 is defined by the entry region 128 having a relatively small radius $R_1$. The self-induced or applied air bearing is maintained between the operating surface of the head and the tape in the large radius region 130 of the transducing gap area 118. A second relatively small radius portion 132 is found at the exit side of the magnetic transducer head. Portion 132 has a small radius $R_3$ which may be equal to radius $R_1$.

While the desired fluid bearing is created at the entry area 128 and is maintained over the transducing area 130, and while this reduces wear of both the head structure and record media and maintains substantially constant transducing signals, at the point where the contour changes from one radius such as $R_1$ to a different radius such as $R_2$ there results a sudden change in the forces acting on the tape and on the head resulting in unstable operation and wear in this area. Further, since the operating surface portions 134 and 136 adjacent the entry and exit portions 128 and 132 are nominally flat, and since the central or transducing portion 130 is of a relatively large radius, these surfaces do not generate the necessary normal force required to control the desired spacing prior to and subsequent to passing the relatively short portions of small radius at $R_1$ and $R_3$. Air bubbles may form under dynamic conditions which upset the head to tape relationship at the transducing gap area 118. Further, self-damping of the transfer oscillations (up and down) by the tape tension means is insufficient.

Figure 3:
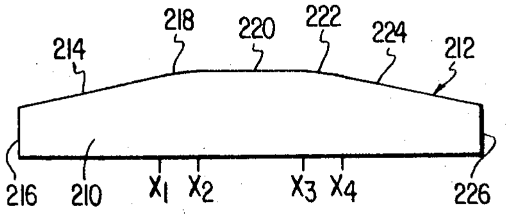
FIG 3 PRIOR ART
FIG. 3 is a schematic representation of a prior art, compound radius, air bearing head with curved operating surface portions separated by flat surface portions.

Perhaps the most simplified illustration of the disadvantages of the generally compound radius self-lubricated transducer head may be seen by reference to the schematic representation of FIG. 3. In this case, magnetic transducer head 210 is provided with an upper operating surface over which lies a magnetic tape (not shown) moving at a given velocity, under a desired wrap angle and spaced slightly therefrom by a self-induced or applied fluid bearing. The operating surface 212 is characterized by a flat portion 214 from the leading edge 216 to a point designated $X_1$, a curved entry surface portion 218 between $X_1$ and $X_2$, and at a given radius of constant value, a flat transducing portion 220 between $X_2$ and $X_3$ and a curved exit surface portion 222 between $X_3$ and $X_4$, again at a given radius (preferably equal to the radius of section 218) and, finally, a trailing surface portion 224 which is flat, between $X_4$ and the trailing edge 226 of the transducer head.

Figure 4:
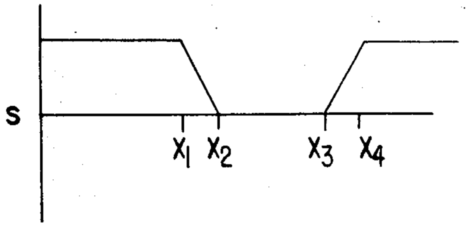
FIG. 4 is a plot of the slope of the transducer head operating surface of the compound radius head of FIG. 3.
Figure 5:
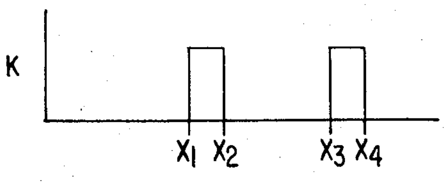
FIG. 5 is a plot of the curvature of the operating surface of the transducer head shown in FIG. 3.

Reference to FIG. 4 shows the plot of the slope of the typical compound radius head of FIG. 3. A constant, slope at a given angle exists from leading edge 216 to point $X_1$. The slope increases from $X_1$ and $X_2$ and remains constant for flat transducing section 220. The slope then changes rapidly from $X_3$ to $X_4$ for exit section 222 and remains constant between $X_4$ and the trailing edge 226. In practical design, the curvature of the head surface is a function of the derivative of the slope, specifically curvature by definition is the second derivative of the surface divided by the quantity 1 plus the first derivative squared to the 1.5 power, and the plot of the same is shown in FIG. 5. The curvature K which is equal to 1 over the radius of curvature, shows zero curvature between leading edge 216 and the curved entry section 218 at $X_1$. The curvature remains constant at a set value between $X_1$ and $X_2$ with both, this curvature and that for the exit portion 222 between $X_3$ and $X_4$, changing in step fashion forming an abrupt line of discontinuity between flat sections 214 and 220 for entry section 218 and between flat sections 220 and 224 for exit section 222.

The present invention is directed to a continuously variable radius contour for the surface of the magnetic transducer head which permits transition from a very large radius in the entrance region to a small radius at the recording gaps. By avoiding step changes of curvature, the dynamic jerk experienced by the tape becomes small, the tape conforms more closely to the head contour, and variations of pressure in the air film are less abrupt. Changes of "washboard" effects are minimized with an initial contour approximating natural bending curves, and head wear is less likely to cause secondary contour changes. Recording performance may therefore be maintained over a longer life span.

The present invention is directed particularly to a magnetic transducer head of this type which carries two transducer gaps which are spaced apart. In this case, the head is symmetrical about a point intermediate of the two gaps, and for each gap, the minimum radius occurs at the gap location.

Figure 6:
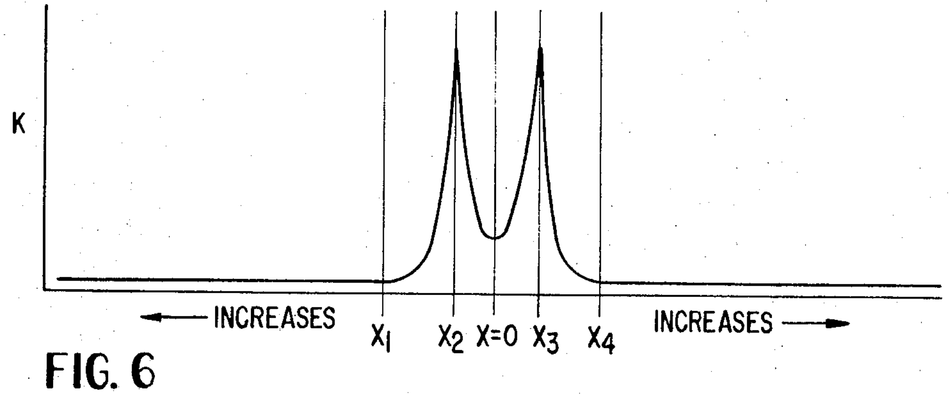
FIG. 6 is a plot of curvature of the head surface of a proposed transducer head whose surface is characterized by a continuous second derivative of the same.

Reference to FIG. 6 shows a function of the second derivative of the head surface of the present invention wherein the curvature K is continuously varied with the configuration shown having the desired radius of curvature between surface portion $X_2$ and $X_3$ in the gap region, required entrance and exit angles in the surface portions between $X_1$ and $X_2$ and $X_3$ and $X_4$ and the required radius of curvature in the entrance, and central regions of the transducer head operating surface. With the variable radius contour as shown by the plot of the curvature in FIG. 6, transition from a very large radius in the entry region to a small radius at the recording gap is readily achieved. Normal loading of the tape may start at a low level which gradually increases to a maximum load at the gap between $X_2$ and $X_3$. As a result, the tape to head spacing is well controlled in the entrance region, in the transition region and in the operation region. For instance, in the entrance region, head to tape spacing reduces to 100 microinches, in the transition region the spacing reduces from 100 microinches to a dimension on the order of 20 to 40 microinches and in the operation region spacing is preferably maintained at 20—40 microinches. A high normal load at the gaps is essential for maintaining a stiff air bearing and this is accomplished readily by the head surface of the present invention which is characterized by small radii in the area of the gap while in the area between the gaps, the normal load and associated wear exposure is deliberately decreased by transition to larger radii. In fact, the distribution of normal load and indirectly the head to tape spacing may be more closely controlled with heads employing the present head operating surface configuration than in the prior art compound radius heads. It is noted for instance that, in a given example, the larger radius of curvature at the entry and exit region of the transducer which may be in the order of 20 inches, merges into a 1-inch radius at the transition gap and then into a 5-inch radius at the center of the head. Of course the radii continuously change to blend a series of radii into one continuous surface. It may be stated, that the transducer head of the present invention is characterized by having (1) a curved surface configuration such that there is no step change in curvature along its complete length, (2) at any given point along its length there is but a single radius of curvature, and (3) a continuously varying radius of curvature which defines the operating surface.

Figure 7:
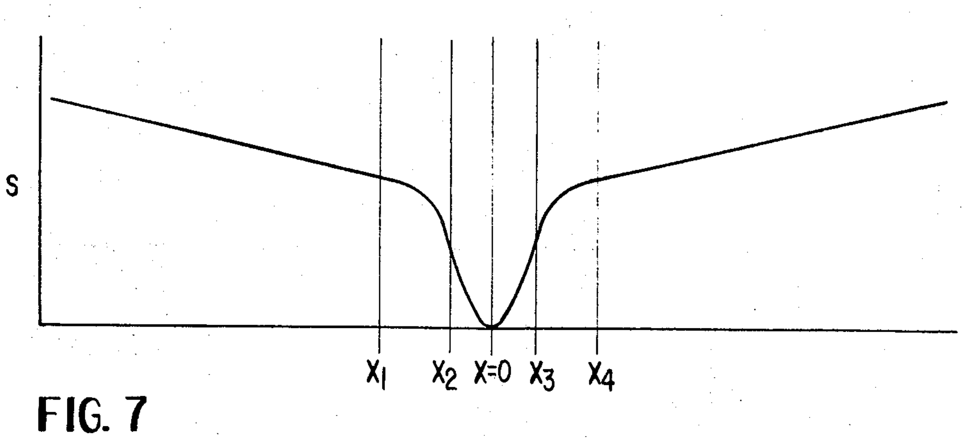
FIG. 7 is a plot of the slope of the transducer head operating surface of the transducer of the present invention whose curvature is shown in FIG. 6.
Figure 8:
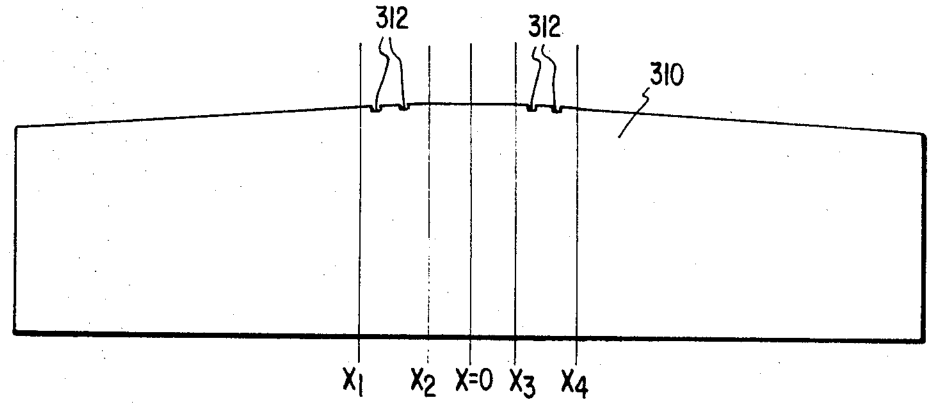
FIG. 8 is a schematic sectional representation of the transducer head of the present invention with the operating surface conforming to the slope of FIG. 7, and the curvature of FIG. 6.

This relationship may readily be seen by further reference to FIGS. 7 and 8. While the schematic sectional representation of the head 310 as shown in FIG. 8 is essentially a compound curved radius head of FIG. 3, in fact the difference between the prior art configuration and that of the present invention becomes readily apparent when viewing FIG. 7 where the slope for the transition and operating regions between $X_1$ and $X_4$ are readily distinguishable over those for the same regions in FIG. 4. With reference to FIGS. 6, 7 and 8, the Figures were developed from computer-generated information concerning an actual head design incorporating the concepts of the present invention. It is to be noted that the head is symmetrical about its center point and starting from a reference point at the center, $X=0$, the $X$ distance indication increases in either direction therefrom. The computer given plot points and the parameters relative to this example are as follows:

LIST OF POINTS, DIMENSIONS IN INCHES

| | Figure 8 | | | | |
|---|---|---|---|---|---|
| | X | Y | Angle | Figure 7, slope | Figure 6, curvature |
| Gap position... | 0.0 | 0.0 | −0.000 | −0.0000 | 0.200 |
| | 0.005 | 0.00000 | 0.061 | 0.0011 | 0.204 |
| | 0.010 | 0.00001 | 0.114 | 0.0020 | 0.213 |
| | 0.015 | 0.00002 | 0.181 | 0.0032 | 0.231 |
| | 0.020 | 0.00004 | 0.254 | 0.0044 | 0.257 |
| | 0.025 | 0.00007 | 0.324 | 0.0057 | 0.286 |
| | 0.030 | 0.00010 | 0.416 | 0.0073 | 0.326 |
| | 0.035 | 0.00014 | 0.521 | 0.0091 | 0.375 |
| | 0.040 | 0.00019 | 0.624 | 0.010b | 0.423 |
| | 0.045 | 0.00025 | 0.760 | 0.0133 | 0.486 |
| | 0.050 | 0.00033 | 0.917 | 0.0160 | 0.557 |
| | 0.055 | 0.00041 | 1.069 | 0.0187 | 0.624 |
| | 0.060 | 0.00051 | 1.270 | 0.0222 | 0.710 |
| | 0.065 | 0.00064 | 1.497 | 0.0261 | 0.804 |
| | 0.070 | 0.00076 | 1.716 | 0.0300 | 0.891 |
| | 0.075 | 0.00093 | 2.000 | 0.0349 | 1.000 |
| | 0.080 | 0.00113 | 2.273 | 0.0397 | 0.817 |
| | 0.085 | 0.00132 | 2.466 | 0.0430 | 0.684 |
| | 0.090 | 0.00155 | 2.651 | 0.0463 | 0.553 |
| | 0.095 | 0.00180 | 2.801 | 0.0489 | 0.445 |
| | 0.100 | 0.00203 | 2.905 | 0.0507 | 0.367 |
| | 0.105 | 0.00230 | 3.004 | 0.0524 | 0.293 |
| | 0.110 | 0.00258 | 3.083 | 0.0538 | 0.233 |
| | 0.115 | 0.00282 | 3.137 | 0.0548 | 0.192 |
| | 0.120 | 0.00311 | 3.189 | 0.0557 | 0.153 |
| | 0.125 | 0.00340 | 3.231 | 0.0564 | 0.124 |
| | 0.130 | 0.00366 | 3.260 | 0.0569 | 0.104 |
| | 0.135 | 0.00396 | 3.289 | 0.0574 | 0.087 |
| | 0.140 | 0.00426 | 3.313 | 0.0578 | 0.074 |
| | 0.145 | 0.00454 | 3.332 | 0.0582 | 0.066 |
| | 0.150 | 0.00485 | 3.351 | 0.0585 | 0.060 |
| | 0.155 | 0.00511 | 3.366 | 0.0588 | 0.056 |
| | 0.160 | 0.00542 | 3.383 | 0.0591 | 0.053 |
| | 0.165 | 0.00573 | 3.398 | 0.0593 | 0.052 |
| | 0.170 | 0.00600 | 3.412 | 0.0596 | 0.051 |
| | 0.175 | 0.00631 | 3.427 | 0.0598 | 0.050 |
| | 0.180 | 0.00663 | 3.442 | 0.0601 | 0.050 |
| | 0.185 | 0.00690 | 3.455 | 0.0603 | 0.050 |
| | 0.190 | 0.00722 | 3.470 | 0.0606 | 0.050 |
| | 0.195 | 0.00753 | 3.485 | 0.0608 | 0.050 |
| | 0.200 | 0.00781 | 3.498 | 0.0611 | 0.050 |
| | 0.205 | 0.00812 | 3.513 | 0.0614 | 0.050 |
| | 0.225 | 0.00935 | 3.570 | 0.0624 | 0.050 |
| | 0.245 | 0.01062 | 3.628 | 0.0634 | 0.050 |
| | 0.265 | 0.01189 | 3.685 | 0.0644 | 0.050 |
| | 0.285 | 0.01320 | 3.743 | 0.0654 | 0.050 |
| | 0.305 | 0.01451 | 3.800 | 0.0664 | 0.050 |
| | 0.325 | 0.01585 | 3.858 | 0.0674 | 0.050 |
| | 0.345 | 0.01721 | 3.915 | 0.0684 | 0.050 |
| | 0.365 | 0.01859 | 3.973 | 0.0694 | 0.050 |
| | 0.385 | 0.01999 | 4.030 | 0.0705 | 1.050 |
| | 0.405 | 0.02141 | 4.088 | 0.0715 | 0.050 |
| | 0.425 | 0.02284 | 4.145 | 0.0725 | 0.050 |
| | 0.445 | 0.02431 | 4.203 | 0.0735 | 0.050 |
| | 0.465 | 0.02579 | 4.260 | 0.0745 | 0.050 |
| | 0.485 | 0.02728 | 4.318 | 0.0755 | 0.050 |
| | 0.505 | 0.02881 | 4.375 | 0.0765 | 0.050 |
| | 0.525 | 0.03035 | 4.433 | 0.0775 | 0.050 |
| | 0.545 | 0.03191 | 4.490 | 0.0785 | 0.050 |
| | 0.565 | 0.03348 | 4.548 | 0.0795 | 0.050 |
| | 0.585 | 0.03508 | 4.605 | 0.0806 | 0.050 |
| | 0.605 | 0.03671 | 4.663 | 0.0816 | 0.050 |
| | 0.625 | 0.03835 | 4.720 | 0.0826 | 0.050 |
| | 0.645 | 0.04001 | 4.778 | 0.0836 | 0.050 |
| | 0.665 | 0.04169 | 4.836 | 0.0846 | 0.050 |
| | 0.685 | 0.04340 | 4.893 | 0.0856 | 0.050 |
| | 0.705 | 0.04512 | 4.951 | 0.0866 | 0.050 |
| | 0.725 | 0.04686 | 5.008 | 0.0876 | 0.050 |
| | 0.745 | 0.04863 | 5.066 | 0.0886 | 0.050 |
| | 0.765 | 0.05042 | 5.123 | 0.0897 | 0.050 |
| | 0.785 | 0.05222 | 5.181 | 0.0907 | 0.050 |

While the proposed magnetic head 310 of the present invention operates satisfactorily without surface modification, the fact that the tape is wrapped over a radius surface head under tension, causes pressure to be built up between the head and the tape. If the tape were perfectly flexible, this pressure would be equal to the tension divided by the radius of curvature. In typical applications, a radius of curvature of 1.0 inches or larger results in a very large head-to-tape separation. It is proposed to reduce this separation by the employment of a series of narrow and shallow slots 312 running perpendicular to tape motion to further provide optimized pressure distribution for the fluid bearing. These slots become sinks at atmospheric pressure (0 p.s.i.g.). Because of the zero pressure, some of the flow brought along with the tape leaves through the slots or sinks. This results in a decrease in head-to-tape separation in the region downstream from the sinks. Thus, this has the effect of controlling the separation without the use of external pneumatic supplies. This concept of separation control is equally applicable to constant or continuous curvature head contours, or continuously variable curvature. In each case, however, the slots 312 are located on the curved portion of the head surface, since slots located on the flat region will not result in workable control. By varying the number of slots and their geometry, the head-to-tape separation may be readily varied.

The material forming the magnetic transducing head is conventional with the head employing $\mu$ metal or ferrite pole pieces separated by nonmagnetic shield formed for instance of copper or of alternate laminations of copper and $\mu$ metal.

While the invention has been particularly shown and described with reference to preferred embodiments thereof, it will be understood by those skilled in the art that various changes in form and detail may be made therein without departing from the spirit and scope of the invention.

What We claim:

1. In a magnetic head having an operating surface adapted to support a fluid bearing between itself and a tape moved thereover, the improvement wherein said operating surface has a curvature defined by a continuously varying radius.

2. The magnetic transducer head as claimed in claim 1 wherein said curved operating surface is continuous up to the second derivative.

3. The magnetic head as claimed in claim 1 further comprising a plurality of spaced transducing gaps with the minimum radius of curvature for said operating surface occurring at each gap thereof.

4. The transducer apparatus as claimed in claim 3 wherein said fluid bearing is self-induced by said magnetic tape moving at a given velocity over said curved operating surface and said transducer further includes transverse slots formed in at least the transducing portion of the head operating surface to reduce the thickness of air film existing therebetween.

5. Transducer apparatus comprising; a magnetic transducer head including at least one transducing gap, means including a moving magnetic tape defining a fluid bearing between the tape and the head operating surface, said operating surface, said operating surface including at least an entry portion and a transducing portion carrying said transducing gap with said operating surface defined by a variable radius without a step change in curvature throughout the length thereof.

6. The transducer apparatus as claimed in claim 5 wherein said fluid bearing is self-induced by said magnetic tape moving at a given velocity over said curved operating surface and said transducer apparatus further includes transverse slots formed in at least the transducing portion of said head operating surface to reduce the thickness of the air film existing therebetween.

UNITED STATES PATENT OFFICE

CERTIFICATE OF CORRECTION

Patent No. 3,582,917 Dated June 1, 1971

Inventor(s) Friedrich R. Hertrich et al

It is certified that error appears in the above-identified patent and that said Letters Patent are hereby corrected as shown below:

In column 6, line 55- delete"said operating surface," (Claim 5)

Signed and sealed this 26th day of October 1971.

(SEAL)
Attest:

EDWARD M.FLETCHER,JR.
Attesting Officer

ROBERT GOTTSCHALK
Acting Commissioner of Patents